D. M. LASLEY.
DIFFERENTIAL CLUTCH.
APPLICATION FILED APR. 7, 1913.
1,128,465.
Patented Feb. 16, 1915.
3 SHEETS—SHEET 1.
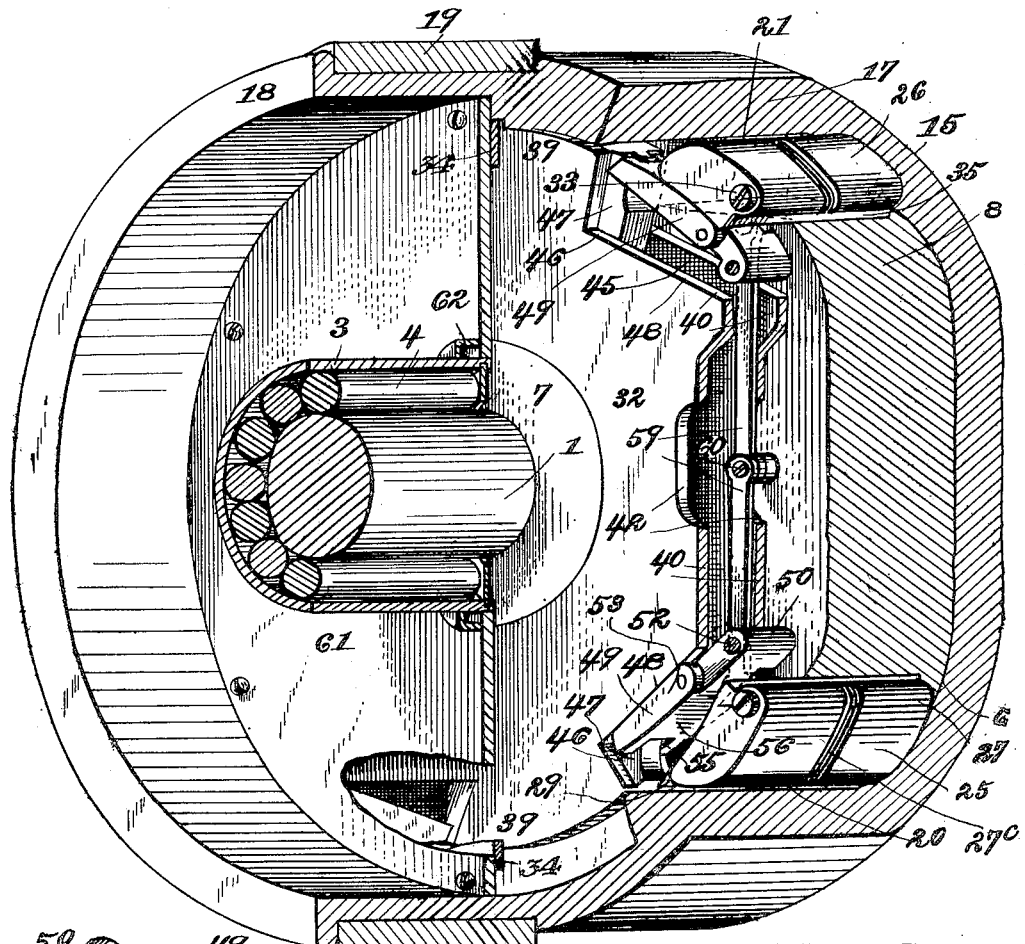
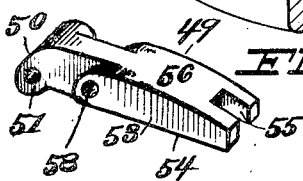
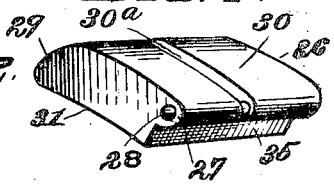
Witnesses:
J. C. Turner
Hazel Owen
Inventor
Dana M. Lasley
Bond & Miller
Attorneys.

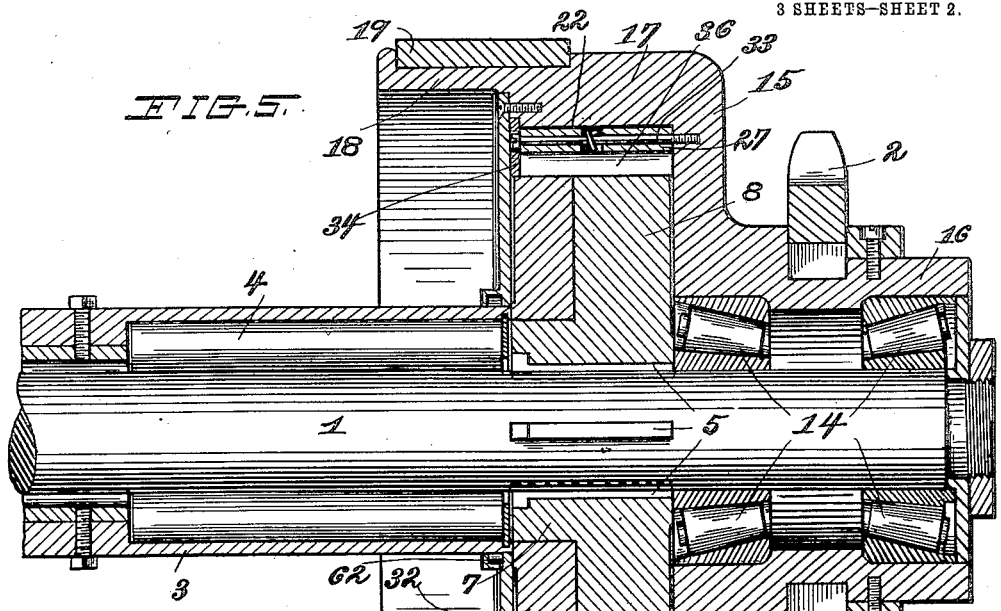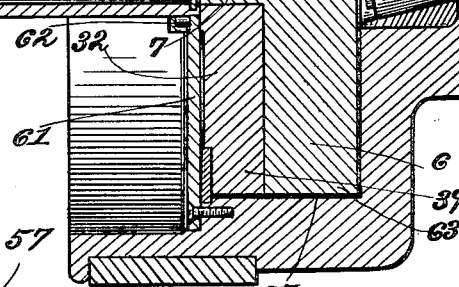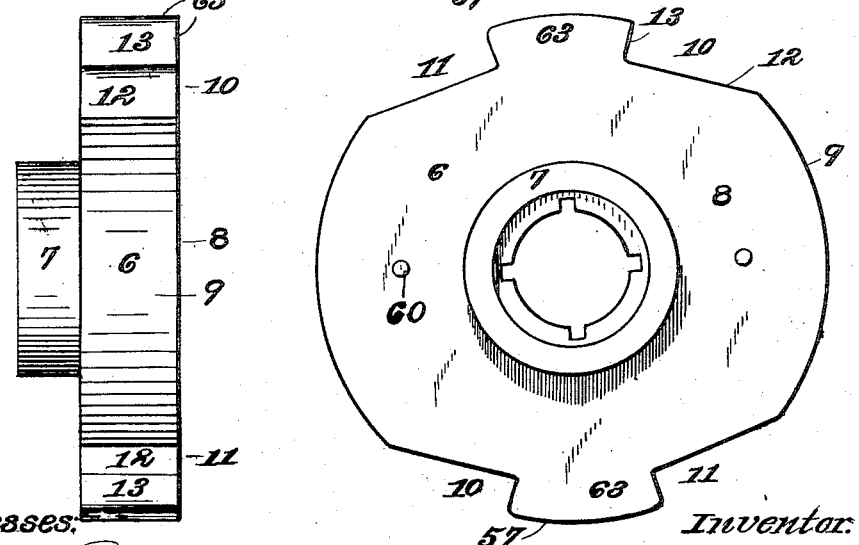

D. M. LASLEY.
DIFFERENTIAL CLUTCH.
APPLICATION FILED APR. 7, 1913.
1,128,465.
Patented Feb. 16, 1915.
3 SHEETS—SHEET 3.
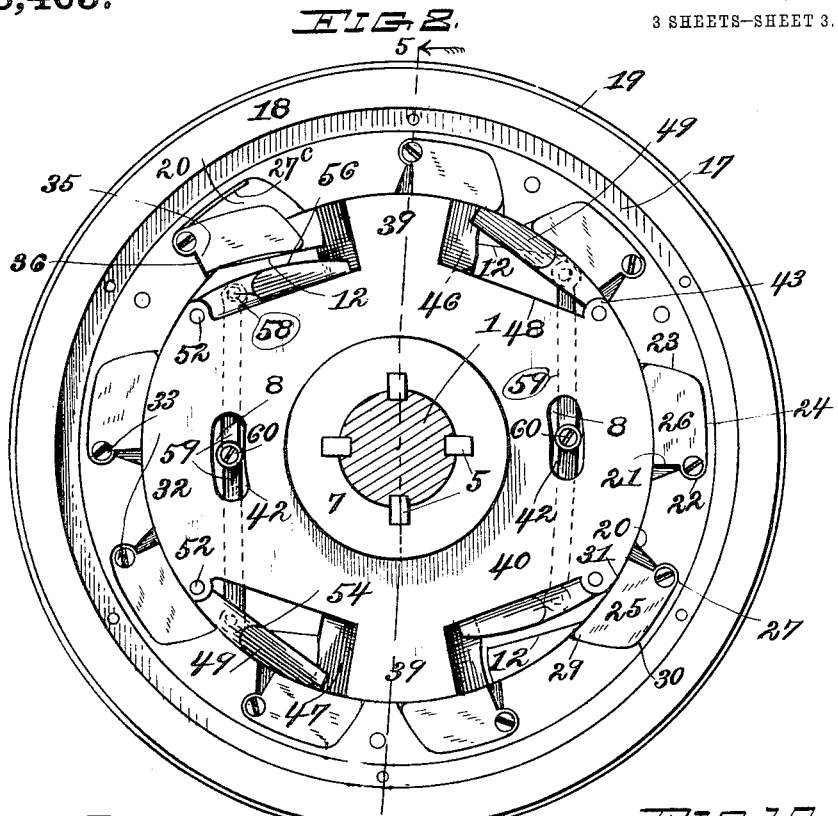
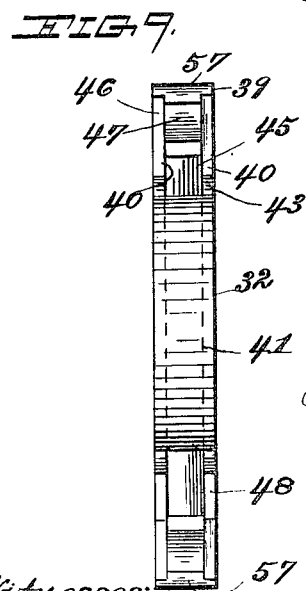
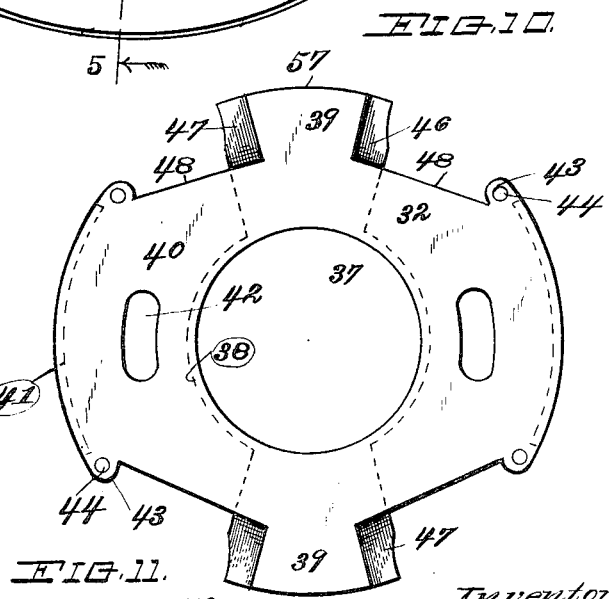
Witnesses:
J. C. Turner
Inventor:
Dana M. Lasley
Bond & Mills
Attorneys

UNITED STATES PATENT OFFICE.

DANA M. LASLEY, OF CANTON, OHIO, ASSIGNOR TO THE DIFFERENTIAL CLUTCH COMPANY, OF CANTON, OHIO, A CORPORATION OF OHIO.

DIFFERENTIAL CLUTCH.

1,128,465.  Specification of Letters Patent.  Patented Feb. 16, 1915.

Application filed April 7, 1913. Serial No. 759,267.

*To all whom it may concern:*

Be it known that I, DANA M. LASLEY, a citizen of the United States, residing at Canton, in the county of Stark and State of Ohio, have invented a new and useful Differential Clutch, of which the following is a specification.

My invention relates to improvements in automatic or differential clutches, and while adapted for many uses is particularly suited for use on motor vehicles and the like, the device being adapted to automatically clutch a rotating member to a rotated member in either forward or backward movement so long as the rotated member requires to be driven, but permitting the rotating member to over-run under certain conditions, such as in making a turn in the case of motor vehicles and the like.

The objects of the invention are, to generally improve devices of the character mentioned, to simplify the construction thereof, to insure certain and positive operation, and to reduce backlash or lost motion to the minimum. These objects, together with many other objects may be attained by the construction illustrated in the accompanying drawings, although the invention may be embodied in other forms, the construction illustrated being chosen by way of example.

In the drawings Figure 1 is a perspective view of a differential clutch embodying my invention, parts being broken away to more fully disclose the internal construction. Fig. 2 is a fragmentary perspective view showing one of the driving dog receiving recesses in the driving disk. Fig. 3 is a perspective view of one of the dog lifting members. Fig. 4 is a perspective view of one of the driving dogs. Fig. 5 is a sectional view through a clutch embodying my invention such as illustrated in Fig. 1. Fig. 6 is an edge elevation of the driving disk. Fig. 7 is a side elevation of the same. Fig. 8 is an inner side elevation of the clutch with the inner protecting plate removed. Fig. 9 is an edge elevation of the dog controlling disk. Fig. 10 is a side elevation of the same. Fig. 11 is a perspective view of one of the dog throwing springs.

Throughout the several views similar reference numerals indicate similar parts.

More specifically describing the construction disclosed in the accompanying drawings the numeral 1 indicates a driving shaft, which in the particular form illustrated in said drawings is a transverse jack-shaft for driving the rear wheels of a motor vehicle by means of a chain (not shown) running over the sprocket 2. The shaft 1 is journaled in the housing 3, roller bearings 4 being preferably provided.

Keyed to the shaft 1 by means of the keys 5, and adapted to rotate with the shaft 1 is the driving disk 6 which is provided with an integral concentric extension or hub 7 of considerably less external diameter than the main body portion 8 of the disk. Concentric with the axis of the shaft 1 is the outer periphery 9 of the driving disk, which outer periphery is, however, interrupted by diametrically opposite driving dog receiving recesses 10 and 11, the said recesses having one side 12 arranged substantially tangentially with reference to a circle, concentric with the driving disk and the other side 13 disposed substantially radially. The disposition of the said sides 12 and 13 produces a square-cornered recess having one side, 12 leading out to the curved periphery 9 so that a dog traveling along on the curved periphery toward the recess would readily fall from the periphery 9 on to the side 12, the other side, 13 of the recess, however, forming an abrupt angle with the periphery 9, so as to produce a shoulder against which a dog traveling over the surface 12, as just described, may very positively engage.

Rotatably mounted upon the shaft 1 by means of the roller bearings 14, the detailed construction of which is not herein claimed and therefore not described, is the outer or rotated member of the clutch mechanism, which member comprises the intermediate disk portion 15, the inner side of which lies closely adjacent the side of the driving disk 6, and the outer, hub-like portion 16 which, in the construction illustrated, is provided with a sprocket 2 to which may be connected a chain belt to be driven. Extending inwardly from the disk portion 15, and formed integrally therewith, is the disk inclosing portion 17, with which is formed integrally, in the construction illustrated, the brake drum portion 18 on which the brake band 19 is arranged.

Internally the disk inclosing portion 17 is of a width equal to the combined width of the main body portion 8 and hub portion 7 of the driving disk. The internal diameter of the disk inclosing portion 17 is such as to just receive the disk 6, the outer periphery 9 of said disk moving freely within the inner periphery of said portion 17. Let into the portion 17 from the inner periphery thereof are the driving dog recesses 20 and 21, the recesses 20 being five in number and the recesses 21, four in number in the construction illustrated. Each recess is provided with a rounded portion 22 and an opposite beveled portion 23, the outer edge 24 being preferably curved concentric with the inner surface of the portion 17, as clearly illustrated in Fig. 8. It will be noted that all of the recesses 20 are arranged with their beveled portions 23 disposed in one direction whereas the similar beveled portions of the recesses 21 are disposed in the opposite direction. Further explanation of the arrangement and disposition of said recesses will be hereinafter given.

The driving dogs 25 and 26, in the recesses 20 and 21 respectively, are all substantially alike and, as shown in Fig. 4, are provided with a rounded barrel portion 27 provided with the bolt receiving aperture 28 and at the opposite end with the beveled nose 29 adapted to fit the recesses 10 and 11 in the disk 6. The outer face 30 of each dog is adapted to fit the outer edge 24 of the recess and the inner face 31 is adapted to conform to the general curvature of the inner surface of the portion 17 when the dog is in its outward position, as illustrated in Fig. 8. Each dog 25 or 26 is of a sufficient width to extend entirely across the driving disk 6 and the dog controlling disk 32, as clearly illustrated in Fig. 5. The dogs 25 and 26 are held in place within their appropriate recesses in the disk inclosing portion 17 by means of the connecting screws 33 which extend into the disk portion 17, as illustrated in Fig. 5. An annular screw supporting ring 34 with apertures to receive the heads of the screws 33 supports and maintains said screws in proper position at their head ends, but it will be understood that said screws are not subjected to any of the driving strain, as the barrel portions 27 fitting within the rounded portions 22 of the driving dog receiving recesses and the back edge 35 of the dog bearing against the edge 36 of the recess when the dog is in the driving position relieve the said screws 33 from all driving strain and give a positive, firm driving connection.

Referring now to the construction of the dog controlling disk 32, it should be noted that the same is provided with a large bearing aperture 37 adapted to receive the hub 7 of the driving disk. The controlling disk is substantially of the width or thickness of the extension or hub 7 and of an external diameter substantially equal to the diameter of the main body portion 8 of the driving disk. The disk 32 includes a bearing portion 38 constituting, throughout its greater extent, a collar defining the aperture 37, and the integral solid lug portions 39 disposed diametrically opposite each other. Formed integrally with the lug portions 39 and the bearing portion 38 are the spaced walls 40 of plate-like formation connected at their outer edges by the peripheral face portions 41 having their outer surfaces lying in a circle concentric with the aperture 37. The walls 40 are provided with the curved apertures 42 and at the ends of the portions 41 are also provided with the integral dog-lifting-member-attaching ears 43 which, by reason of the walls 40 being spaced from each other will be arranged in pairs provided with attaching pin apertures 44.

Considering the lug portions 39 it will be noted that each of said portions is flanked by two apertures 45 leading into the space between the walls 40. The sides of each portion 39 are provided with angular recesses 46 producing the reduced dog-lifting-member-guiding portions 47. The edges of the walls 40 between the ears 43 and the portions 39 where the recesses 46 are formed are preferably straight, providing ledges 48 formed by the edges of the walls 40 upon which the dog-lifting members 49 may rest when in their inner position as shown in the upper left-hand and lower right-hand portions of Fig. 8.

Each dog-lifting member comprises an attaching barrel portion 50 provided with an aperture 51 for the reception of an attaching pin 52 passing through the apertures 44 of one pair of ears 43 and pivotally connecting the member 49 to said ears. Said member 49 is provided with an elongated body portion 53 having a straight inner edge 54 adapted to contact with the ledge 48 and with a guiding slot 55 in its free end adapted to receive the portion 47. The outer face 56 of the dog is curved so that when the slotted free end of the dog is moved outwardly into the position illustrated in the upper right-hand and lower left-hand portions of Fig. 8 said outer face 56 will continue the general curved periphery of the face portions 41 and outer face edges 57 of the lug portions 39.

To each dog-lifting-member at 58 is connected a connecting link 59, which link extends through the adjacent aperture 45 into the space between the walls 40 of the dog controlling disk. It will be noted that the dog-lifting-members 49 are arranged in oppositely disposed pairs and that the two members on either side of a line passing through the lug portions 39 are oppositely disposed. The two links 59 of each of said pairs of dog-lifting-members are pivotally connected at their inner ends by means of a screw 60 passing through the aperture 42 in the wall 40 adjacent the driving disk 6. Said screw 60 extends into and is fixedly connected to said driving disk 6, the links 59 of each pair being of such length that when the said connection is made one of the connected dog-lifting-members only may be in the outer position at any one time, relative rotation as between the driving disk 6 and the dog controlling disk 32 being adapted to move the dog-lifting-members, as will be readily understood.

For the purpose of covering the movable parts and keeping the same free from dust and dirt the inner protecting plate 61 is provided, which plate is connected around its outer edge to the disk inclosing portion 17 and is provided with a central aperture and a dust washer 62 at the edge thereof, said dust washer being adapted to engage the housing 3 to prevent the entry of dirt and dust into the internal mechanism.

For the purpose of causing the driving dogs 25 and 26 to normally press inwardly against the periphery 9 of the disk 6 a spring 27ª is provided, which spring is preferably of the form illustrated in Fig. 11 and provided with the intermediate coiled portion 27ᵇ and the integral spaced arms 27ᶜ. Each dog 25 and 26 is provided with a spring receiving groove 30ª extending from the nose 29 through the barrel portion 27, as clearly illustrated in Fig. 4. In arranging the dogs 25 and 26 in the recesses 20 and 21 one of the springs 27ª is arranged in the groove 30ª of each dog, the connecting screw 33 passing through the coil 27ᵇ to assist in holding the spring in place. One of the arms 27ᶜ will bear upon the outer edge 24 of the dog receiving recess, as shown in Fig. 8, and the other arm will press against the bottom of the groove 30ª, thus causing the nose of the dog to bear against the periphery 9 so as to instantly engage one of the recesses 10 or 11 if at any time permitted to do so by the dog-lifting-members 49.

The operation of the device is as follows:—All parts of the device being at rest, when the shaft 1 is rotated it will cause immediate rotation of the driving disk 6. To this driving disk, it will be remembered, are connected the screws 60, so that there will be immediate movement of the connecting links 59. The dog controlling disk not being fixedly connected to the shaft 1, by reason of inertia, will not be immediately rotated with the first movement of the shaft 1 and the ears 43 being therefore stationary for an instant after the movement of the connecting links 59 has begun, the dog-lifting-members 49 connected to said links will be operated to throw those dog-lifting-members outward which are traveling in the direction of their free ends, while those lifting members which are traveling in the direction of their attaching barrel portions 50 will be drawn inwardly. It should be noted that in the arrangement of the dog controlling disk 32 with reference to the driving disk 6 the solid lug portions 39 of the former are disposed side by side with the driving lugs 63 of the latter, so that the dog receiving recesses 10 and 11 are normally closely adjacent the dog-lifting-members 49 connected to the disk 32. The inertia of the disk 32 having been overcome after the movement of the dog-lifting-members, as described, the driving disk 6 and the controlling disk 32 will begin to rotate together in the direction of the rotation of the shaft 1. The rotation of said disks 6 and 32 with relation to the disk inclosing portion 17 will not be for long, however. It will be understood that those dog-lifting-members which have moved to the outer positions will prevent any of the dogs 25 or 26 from dropping into the dog receiving recesses 10 or 11, as the case may be, but those members 49 which have been drawn inwardly into contact with the ledges 48 will permit the first dog encountered by the adjacent dog receiving recess to be forced into the same. By reason of the arrangement and disposition of the dogs 25 and 26, a dog, properly disposed, will be almost immediately encountered regardless of the direction of rotation of the shaft 1 and disks 6 and 32 and said dog entering the opened recess 10 or 11, as the case may be, the nose 29 of said dog will engage the side 13 of the recess, thus positively locking the disk inclosing portion 17 to the driving disk 6 for rotation therewith. This positive-clutched condition of the parts will continue so long as there is resistance to the rotation of the disk inclosing portion 17.

It will be understood that differential clutches such as described should usually be employed in pairs, two clutches of the character described being mounted upon opposite ends of the shaft 1, and the position of the various dogs and their position-differentiated portions being reversed with reference to each other. When the driven member, as the portion 17 of one clutch has no work to do, while the corresponding member of the other clutch continues to have work to do as in turning a corner in an automobile, it will be understood that the driven member having a tendency to overrun, will be free to do so until such time as it again takes up further work or resistance, whereupon one of the driving dogs again automatically assumes the driving position.

In the form of device illustrated in the drawings it will be noted that there are five driving dogs 25 and four driving dogs 26, and it should be pointed out that the five dogs are arranged to operate to drive the driven member in the direction in which it is normally desired to operate it, as in the case of an automobile, in the forward direction, while the dogs 26 are arranged in the opposite direction, as for instance for the purpose of reversing or backing the automobile. It will further be noted that the distribution of the dogs 25 and 26 is such that there is the minimum of backlash or lost motion. Dog receiving recesses in the driving disk adapted to operate to drive the driven member in the same direction are diametrically oppositely disposed on the driving disk and from an inspection of Fig. 8 it will be noted that one or the other of said recesses will be in position to engage an appropriately disposed driving dog within a small fraction of a revolution of the parts, regardless of the relative position of the parts when such rotation is begun. By disposing the two differential clutches proposed to be used upon the same shaft in such way as to divide the backlash between them it will be understood that either one or the other of the said clutches will connect for driving the driven member before the other, thus again reducing by one-half the amount of backlash.

I claim:—

1. A differential clutch comprising a driving shaft, a driven member, a driving member and a controlling member, all concentrically arranged, said driving member fixedly connected to said shaft, said driven member rotatably connected to said shaft, and said controlling member adapted for limited rotation with relation to said driving member, clutching means comprising reversely arranged clutching elements connected to said driven member, means normally urging said clutching elements into clutching connection with said driving member, controlling elements carried by the controlling member, and means connecting said controlling elements and driving member and adapted to actuate said controlling elements by relative rotation of the controlling and driving members, whereby to release the clutching element disposed in one direction to permit it to engage said driving member and to simultaneously retain the oppositely disposed clutching element out of engagement with the driving member.

2. A differential clutch comprising a driving shaft, a driving member fixedly mounted on said shaft, a driven member rotatably connected to said shaft and provided with clutching means comprising oppositely disposed clutching elements and means normally urging said elements into engagement with said driving member to drive the driven member in either direction, a controlling member mounted on said driving member and adapted for rotation with relation thereto and means carried by said controlling member and connected to the driving member and actuated by said relative rotation, said means adapted to release one of said clutching elements to permit it to engage said driving member and to retain the oppositely disposed element out of engagement with the driving member.

3. A differential clutch comprising a driving shaft, a driving disk fixedly mounted on said shaft and provided with a hub portion, a driven member rotatably connected to said shaft and provided with oppositely disposed clutching elements normally tending to engage said driving disk, but adapted to be disengaged therefrom, a controlling disk rotatably mounted on said hub portion, clutching-element-operating members connected to said driving disk and to said controlling disk and adapted to be actuated by relative rotation of said driving and controlling disks and adapted, when actuated, to actuate said clutching elements to release the clutching element disposed in one direction to permit it to operatively engage with said driving member and to restrain the oppositely disposed clutching element from engagement with said driving member and said controlling disk adapted to lag with reference to said driving disk, when said driving disk begins rotation.

4. A differential clutch comprising a driving shaft, a driving disk and a controlling disk, said disks arranged side by side, said driving disk fixedly connected to said shaft and said controlling disk rotatably connected to said shaft, said controlling disk provided with dog-lifting-members, means operatively connecting said dog-lifting-members with said driving disk, a driving member provided with reversely arranged dogs adapted to move into and out of clutching contact with said driving disk, means normally urging said dogs into said clutching contact, said dog-lifting-members adapted to be actuated to maintain the dogs disposed in either direction out of clutching contact with said driving disk, while permitting the dogs disposed in the other direction to move into clutching contact with said disk, and said controlling disk and driving disk adapted for limited relative rotation, whereby to actuate said dog-lifting-members.

5. A differential clutch comprising a driving shaft, a driving disk fixedly mounted on said shaft, a driven member surrounding the driving member, reversely arranged dogs connected to said driven member and adapted to be moved into and out of clutching contact with said driving disk, means normally urging said dogs into said contact, a controlling member arranged side by side with the said driving member, means carried by the controlling member and connected to he driving member, and actuated by relative rotation of the controlling and driving members, to release a dog disposed in one direction, to permit it to engage the driving member and to simultaneously retain the oppositely disposed dog out of engagement with the driving member.

6. A differential clutch comprising a driving shaft, a driving disk and a controlling disk arranged side by side, said driving disk fixedly connected to said shaft and said controlling disk rotatable about said shaft, a driven member surrounding the driving disk and provided with recesses, reversely arranged dogs in said recesses and adapted to move out of said recesses into clutching contact with said driving disk, said driving disk provided with reversely arranged dog-receiving recesses and means carried by the controlling disk and connected to the driving disk, and actuated by relative rotation of the controlling and driving members, to release the dog disposed in one direction to permit it to engage in a corresponding recess of the driving disk and to simultaneously retain the other dog out of engagement with the driving disk.

7. A differential clutch comprising a driving shaft, a driving disk fixedly mounted on said shaft and provided with a hub portion, a controlling disk rotatably mounted upon said hub portion, said driving disk and controlling disk provided with dog-receiving recesses in their edges, dog-lifting-members carried by said controlling disk, means connecting said dog-lifting-members and said driving disk, said driving disk and controlling disk adapted for relative rotation and said connecting means adapted to actuate said dog-lifting-members when said driving and controlling disks are relatively rotated, a driving member surrounding said driving disk and controlling disk and provided with reversely arranged dogs and means normally urging said dogs to enter said recesses, and said dog-lifting-members, when actuated by relative rotation of said driving and controlling disks, adapted to permit a dog disposed in one direction to engage a corresponding recess in the driving member and to retain the dog disposed in the reverse direction out of engagement with the driving member.

8. A differential clutch comprising a driving shaft, a driving member fixedly mounted thereon and comprising a disk shaped body portion and an integral hub portion, the periphery of said disk portion interrupted by reversely disposed driving notches, a controlling disk rotatably mounted upon said hub portion, dog-lifting-members connected to said controlling disk, operative connecting means between said dog-lifting-members and said driving disk and adapted to actuate said members by relative rotation of said driving and controlling disks, said dog-lifting-members adapted to assume outer positions to continue the periphery of said driving disk over said reversely disposed notches, and inner positions, whereby to expose said notches, a driven member surrounding said driving and controlling disks, reversely disposed driving dogs connected to said driven member, said driving dogs normally bearing against the peripheries of said disks and adapted to enter said notches when the same are exposed, and said lifting members adapted to permit one dog to enter a correspondingly disposed notch and to retain the reversely disposed dog out of the reversely disposed notch.

9. A differential clutch comprising a driving shaft, a driven member, a driving member and a controlling member, said driving member fixedly connected to said shaft, said driven member rotatably connected to said shaft, said controlling member connected to said driving member and said controlling and driving members adapted for limited relative rotation, a plurality of reversely arranged clutching means adapted to clutch said driving and driven members together to drive said driven member in either direction and means carried by the controlling member and actuated by the relative rotation of the controlling and driving members, to permit the clutching means disposed in one direction to clutch said driving and driven members and simultaneously to prevent the reversely disposed clutching means from clutching said members together.

10. A differential clutch comprising a first member, a second member and a third member, all adapted for rotation, said third member connected to one of said other members and adapted for limited relative rotation with relation thereto, reversely disposed clutching means for positively clutching said first and second members together for rotation in either direction and controlling means actuated by said relative rotation of said third member and adapted to alternatively release the clutching means disposed in one direction or the other, in accordance with the direction of said relative rotation, so as to permit said clutching means to positively clutch said first and second members together for rotation in one direction, while simultaneously preventing the clutching means disposed in the opposite direction from clutching said first and second members together, and the driven member of the clutch adapted at all times to overrun the driving member, regardless of the direction of rotation.

11. A differential clutch comprising a driving member, a driven member, a controlling member, a clutching dog, and dog-lifting means, said clutching dog adapted to operatively connect said driving and driven members by direct operative interposition therebetween, said dog-lifting means connected to said controlling member and to said driving member and adapted to be actuated by relative rotation of said driving and controlling members, said driving and controlling members adapted for rotation in the direction to cause said dog-lifting means to lift said dog out of operative connection with said driving member when said driven member overruns said driving member, and adapted to be relatively rotated in the opposite direction, whereby said dog-lifting means is moved to permit said clutching dog to operatively connect said driving and driven members, when the driving member overruns the driven member in the same direction.

12. A differential clutch comprising a driving disk, a controlling disk, a driven member, reversely disposed clutching dogs, and dog-lifting means, said dogs normally adapted to operatively connect said driving disk and driven member by direct inter-position therebetween, whereby to drive said driven member in either direction, said dog-lifting means connected to said controlling disk and adapted to be actuated to permit or prevent said clutching dogs connecting said driving disk and driven member, in accordance with the direction in which said dog-lifting means is actuated, said dog-lifting means adapted to permit said dogs to make such connection between the driving disk and driven member, when said driving disk overruns said driven member in either direction and to prevent said dog from making said connection when said driven member overruns said driving disk in either direction.

In testimony that I claim the above, I have hereunto subscribed my name in the presence of two witnesses.

DANA M. LASLEY.

Witnesses:
WILLIAM H. MILLER,
H. M. NAUGLE.